April 8, 1958     H. D. BARKELEW     2,829,730
EXHAUST GAS MUFFLER AND OXIDIZER
Filed June 9, 1954     3 Sheets-Sheet 2
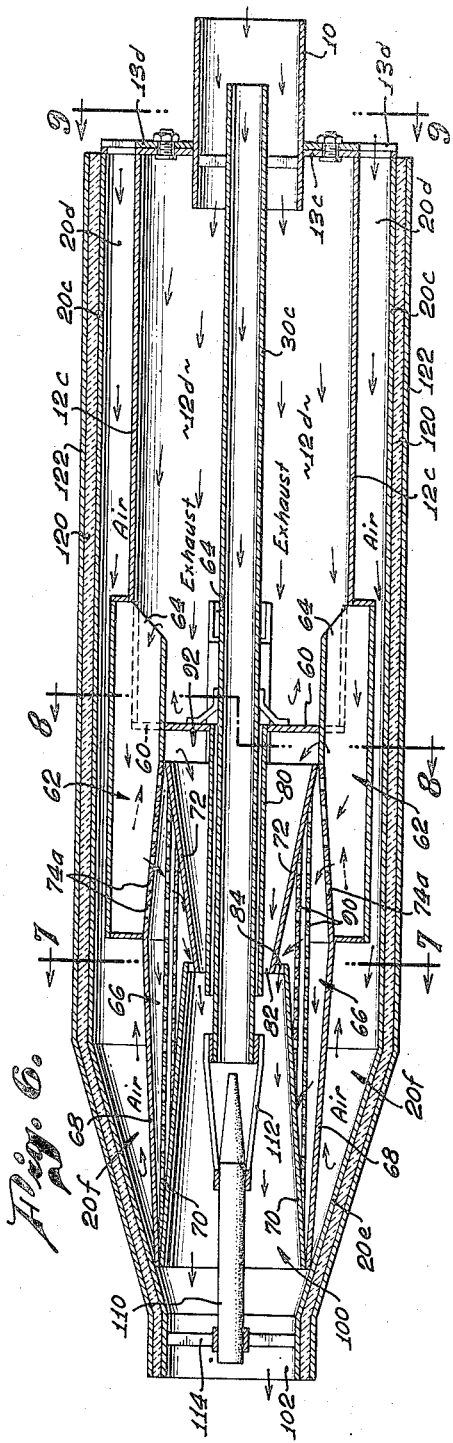
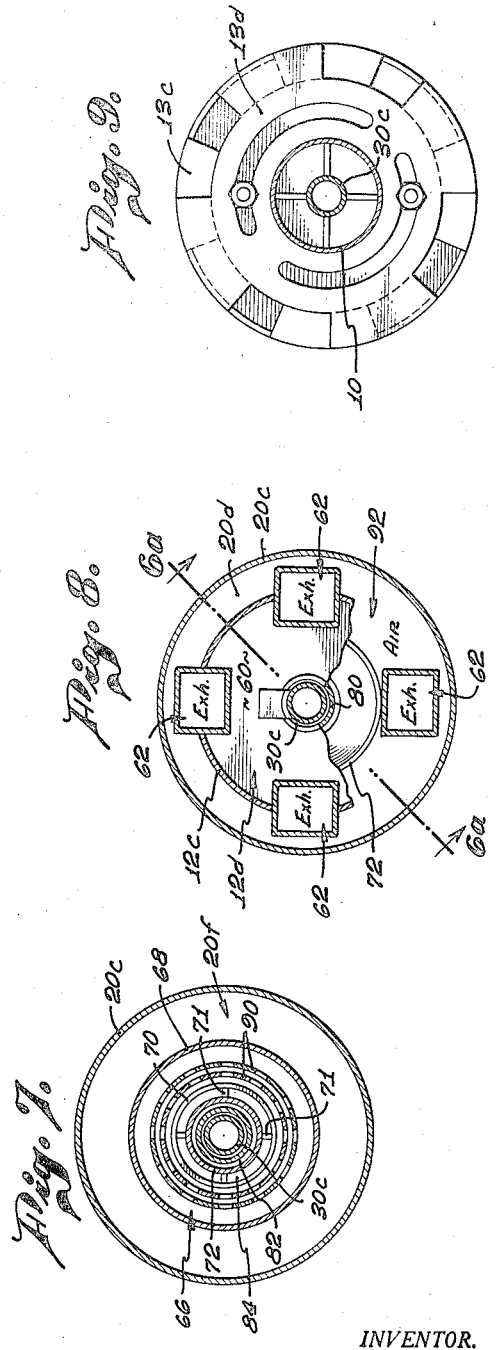
INVENTOR.
HARRY D. BARKELEW,
BY
ATTORNEYS.

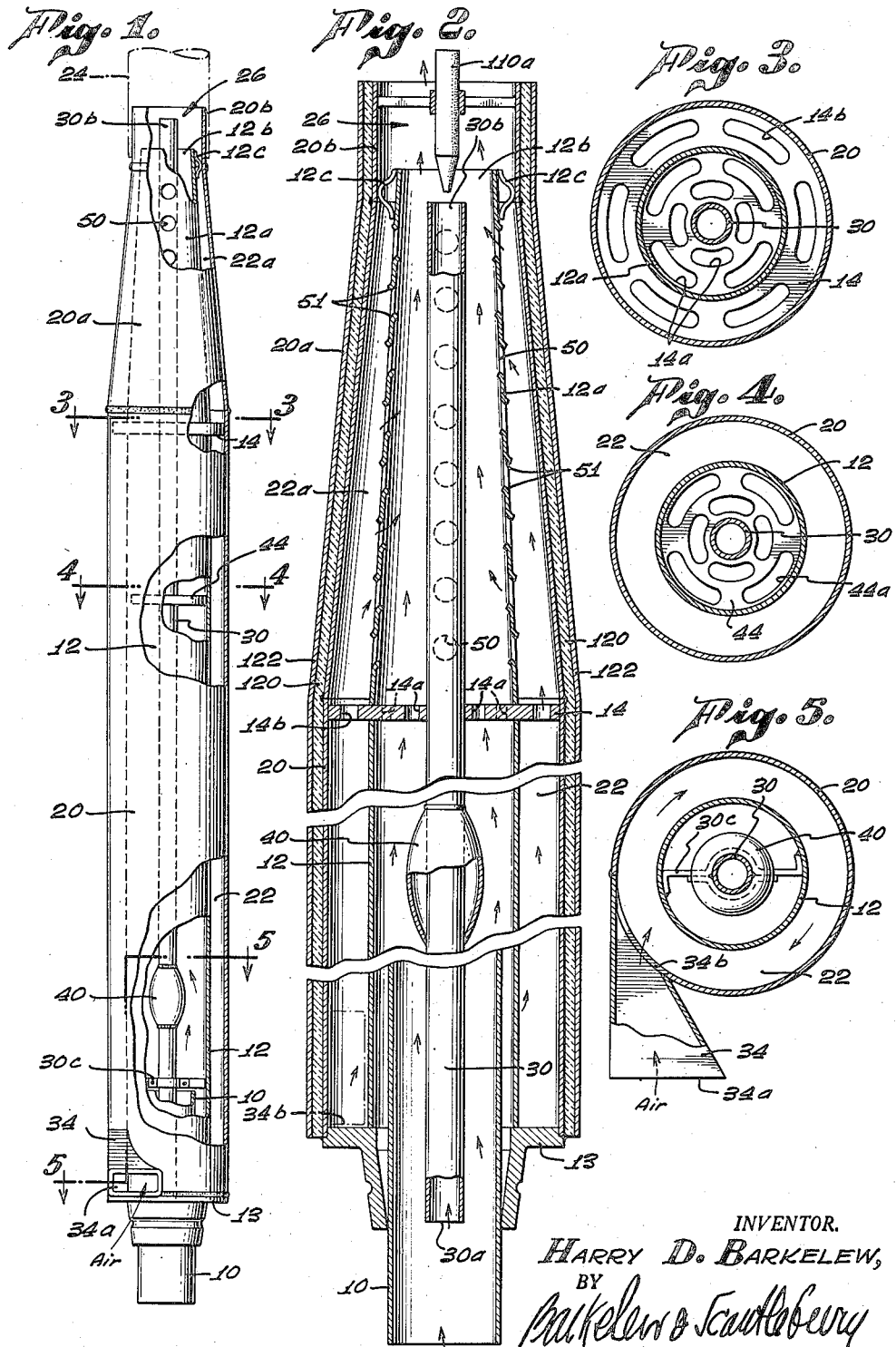

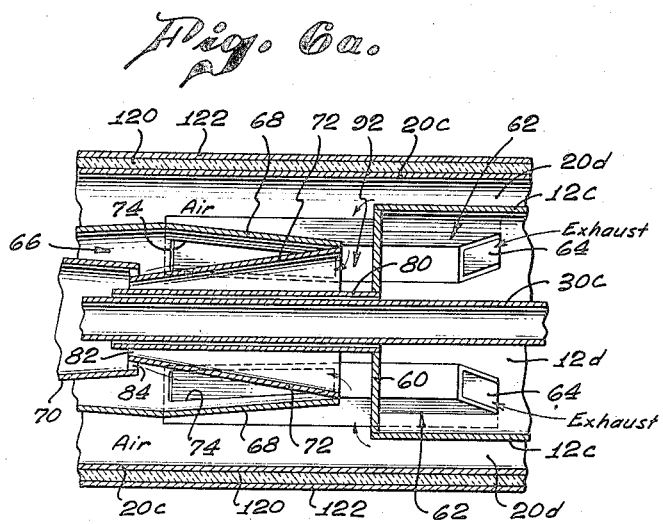

United States Patent Office 2,829,730
Patented Apr. 8, 1958

2,829,730

EXHAUST GAS MUFFLER AND OXIDIZER

Harry D. Barkelew, Alhambra, Calif.

Application June 9, 1954, Serial No. 435,490

13 Claims. (Cl. 183—6)

The present invention has to do with improvements in the type of exhaust gas muffler shown in the patent to Julius C. Kittell, No. 2,263,407, November 18, 1941. The muffler of that patent is characterized by utilizing a central high velocity tube through which a small portion of hot exhaust gases are carried without material cooling and expansion to a point near the final discharge of the muffler. The major portion of the exhaust gas is at the same time mixed with air and cooled in the main body of the muffler surrounding the high velocity tube. That mixing with air not only cools and lowers the pressure of the main body but also provides excess air inducing oxidation of remaining unburnt gases. Then, at or near the final discharge, the still hot gas of the high velocity tube mixes with the main body and, in the presence of the excess air, induces the final oxidation or condensation of any unburnt material.

The present application is a continuation in part of my previous application, Ser. No. 352,901, filed May 4, 1953, now abandoned.

The present invention presents certain improvements on the Kittell type of muffler chief among which the following features may be noted. The added air, which together with the main body of exhaust gas is drawn through the muffler structure by the jet ejector action of the hot high velocity gas, is first heated in a separate passage in heat conducting relation with the main exhaust passage. Preferably that air heating passage surrounds the main exhaust passage which, in turn, surrounds the high velocity tube. The result of that arrangement is, while necessarily cooling and contracting the exhaust gas body, to pre-heat the excess air and at the same time to keep the exhaust gas in the central high velocity tube at high temperature and relatively high pressure, and generally to keep the whole muffler hot. Then the preheated air, together with the main body of exhaust gas, is delivered to an ejector and combustion chamber at the discharge end of the hot high velocity tube where, by the high velocity jet action of the hot gases, the air and the exhaust body are drawn along and all are thoroughly admixed, and final oxidation and combustion of any remaining unoxidized gases takes place. In one form of the invention the relative positions of the pre-heated air and the exhaust body are reversed, by transfer as the streams reach the jet, so that, as initially delivered to the jet action, the preheated air immediately surrounds the hot high velocity jet, in turn surrounded by the main gas body. That arrangement leads to more thorough admixture of the preheated air with all the exhaust gases and more thorough final combustion.

It is also a feature of the present invention that it provides an ignition element which is heated to ignition temperature in the hot gas jet and over which the admixed preheated air and exhaust gases flow. The ignition element assures the ignition and combustion of fuel which might otherwise be not burned when the engine is decelerating or idling. Under average operating conditions the temperature of the hot jet is high enough to insure ignition and combustion of the unburned fuel reaching the muffler.

Those and other features of the invention, and the invention itself, will be better understood from the following detailed descriptions of preferred and illustrative embodiments of the invention shown in the accompanying drawings where:

Fig. 1 is an external view, with parts broken away for illustration of interior parts, showing a simple illustrative embodiment of the invention;

Fig. 2 is an enlarged fragmentary longitudinal central section of the muffler of Fig. 1;

Figs. 3, 4 and 5 are enlarged cross-sections respectively on lines 3—3, 4—4 and 5—5 of Fig. 1;

Fig. 6 is a longitudinal section showing another improved illustrative embodiment of the invention;

Fig. 6a is a fragmentary longitudinal section on line 6a—6a of Fig. 8 and showing certain modifications; and Figs. 7, 8 and 9 are cross-sections respectively on lines 7—7, 8—8 and 9—9 of Fig. 6.

The simple embodiment shown in Figs. 1–5 has been designed, in its air intake particulars, for operation in a vertical position on automotive vehicles, and will be described as in that position but without any limitation thereto.

A vertical tube 10 forms the intake passage for the exhaust gases from the engine. That intake tube projects upwardly a short distance concentrically into the lower end portion of a larger tube 12. The lower end of 12 rests on and is welded to an imperforate head 13 that surrounds and is welded to intake tube 10. Tube 12, which forms the main exhaust gas chamber of the muffler, extends at uniform diameter upwardly, through about the proportionate length shown in Fig. 1, to the level of a transverse perforate diaphragm plate 14. From there on upward tube 12 extends above plate 14 as a tapering and perforated tube 12a which has an upper discharge end 12b near the muffler outlet. The upper end of tapered tube 12a is centered in the external tubular outlet wall 20b of the muffler by brackets 12c which do not materially obstruct the annular air passage around 12b.

An outermost air passage tube 20 concentrically surrounds gas tube 12 in such annular spacing around 12 as to form the annular air passage 22 of about the proportionate dimensions shown in the drawings. The lower end of 20 rests on and is welded to the lower head 13. Tube 20 extends upwardly at uniform diameter to the transverse perforated diaphragm 14 and then above that diaphragm is extended by the tapering portion 20a which leads to the final outlet portion 20b in which the gas outlet 12b is concentrically located. The final outlet 20b can of course be extended to any desired length by a tail pipe such as indicated at 24 in Fig. 1. The outlet portion 20b, and or its tail pipe extension, forms the combustion chamber 26 in which final combustion and oxidation take place.

Centrally located in the concentric tubular structure thus far explained is the relatively small high velocity tube 30 which extends vertically through substantially the whole length of the muffler structure. The lower end 30a is located within the intake tube 10 and well below its upper end, so that hot gases at the relatively high pressure and temperature existing in intake 10 are taken by the lower open end of tube 30. The upper end 30b of tube 30 is located substantially at the outlet 12b where the pressure of mixed air and cooled gases is much lower than in intake 10. Due to that relatively large pressure differential the hot gases flow upwardly through 30 at high velocity and reach the outlet 12b at a temperature very little below that existing in intake 10. The fact that high velocity tube 30 is directly surrounded throughout a great portion of its length by the exhaust gases in tube 12 and its extension 12a, also maintains the gas in 30 at high temperature. The upper end 30b of the tube 30, substantially at outlet 12b, may either be somewhat above (as in Fig. 1) or somewhat below (as in Fig. 2) the extreme upper end of 12b.

An air inlet is provided for introducing air into the lower end of annular air passage 22 and the air inlet may be fed with air under sufficient pressure to cause a rapid air flow through passage 22. For a vertical muffler the air intake means may preferably consist of an air scoop 34 whose open end 34a is faced into the air slipstream to pick up a velocity head from that stream. The scoop delivers the air through its outlet 34b into annular passage 22 in a tangential direction so that the air stream in 22 flows upwardly in a spiral. That spiral flow has the advantage of uniformly cooling the gas tube 12 around its whole wall and thus uniformly cooling the hot gases in it. By the same operation of heat exchange the air is uniformly pre-heated.

For certain uses, as for marine engines or where water is used, water instead of air, or admixed as a spray with air, may be taken in at the air intake to cool and wash the exhaust gases.

The lower end of high velocity tube 30 may be centered in tube 12 by any suitable means, such as a bracket 30c which does not interfere with free flow of gases from 10 and through 12. The gas passage in 12 and around 30 is constricted at a point preferably near the upper end of intake 10, by a member 40 mounted on 30 and effectively locally increasing its external diameter.

The upper part of tube 30 is supported in the diaphragm plate 14. The slotted plate extends transversely across both the gas passage in tube 12 and the annular air passage 22 in outer tube 20. A short distance below transverse plate 14 there is another slotted transverse plate 44 which extends across only the gas passage in gas tube 12 and around tube 30. The relative location of plate 44 is shown in Fig. 1.

Both the plates 14 and 44 form relative restrictions in the passages that they cross. The plates and their distributive or diffusing slots are shown in Figs. 3 and 4. The total area of openings 44a in plate 44 is preferably about 65% of the cross sectional area of the gas intake 10. The total area of the inner set of slots 14a of plate 14 located within tube 12 is preferably about 85% of the intake area. The function of these is, like member 40, to form relative restrictions impeding the free flow of the exhaust gases through gas tube 12 and effectively eliminating exhaust noise.

The total area of the outer set of slots 14b in plate 14 is preferably somewhat less than, say about 50% of, the cross-sectional area of annular air passage 22, so that in normal operation a pressure somewhat higher than atmosphere is held in the air passage below plate 14 if air is fed into the air passage at a pressure above atmospheric.

The tapered upper part 12a of gas tube 12 is perforated with a plurality of openings 50 which are louvered as indicated at 51 so as to induce flow of some air from the surrounding annular air passage 22a into the gas passage within tube 12a. Under normal conditions of operation when air is taken in under pressure the air pressure in 22a will be if anything higher than the gas pressure of the cooled gases within 12a so that air tends to flow through openings 50 to mix with the gases within 12a. The relative constriction of the air passage 22a at the outlet 20b around gas outlet 12b (due to taper of 20a being greater than the taper of 12a) also induces that air flow. The result is that the gases, which have been initially cooled in their upward flow through 12, are directly admixed with a relatively large volume of pre-heated air within 12a and are thus further cooled and contracted in volume, and the air is further heated, by the time they reach outlet 12b. Admixture with air also induces oxidation of unburnt matter, and further reduces exhaust noise.

At or near the outlet 12b, at the upper end of high velocity tube 30, the gases, mixed with an excess volume of air, and the air that is flowing through the surrounding air passage 22a, are all finally subjected to admixture with the hot gases flowing from the discharge end of tube 30 at relatively high velocity. The turbulence induced by that high velocity discharge induces intimate admixture of the three streams, and that and the high temperature of gases from tube 30 induces a further final rapid oxidation of unburnt matter in the pre-heated air adjacent the end of 30 in comustion chamber 26. The temperature of the high velocity gases emerging from tube 30 is very little reduced below the initial temperature, because of the high velocity of flow and because tube 30 is surrounded by hot exhaust gases rather than by the air that is being pre-heated. The final result is that the gases emerging through outlet 20b carry a minimum of unoxidized matter and are condensed to minimum volume at a temperature very close to atmospheric.

The high velocity jet of gases from the discharge end of tube 30 has an ejector action on both the air and the main body of gases in passages 22, 22a and within tubes 12, 12a. The concentric outlets 22b and 12b form nozzles for the air and gas around the high velocity jet at 30b to provide for that ejector action. That ejector action draws air through the passages 22, 22a even if the air is not fed into 12 under pressure. And in drawing the exhaust gases along through 12, 12a it materially reduces the pressure on the main body of exhaust and thus reduces the back pressure on the engine by a substantial amount.

Figs. 6 and following show a further illustrative embodiment of the invention. In those figures, the main body of exhaust gases from the exhaust intake pipe 10 passes into a chamber 12d within a tube 12c; and the high velocity tube 30c has its intake end inside pipe 10 and extends centrally through the exhaust chamber 12d and on through other parts of the muffler, as hereafter described. An outer air tube 20c encloses the annular air passage 20d surrounding the exhaust tube 12c; and air is admitted to the intake end of the air passage through header 13c in an amount under control of the adjustable damper 13d. Header 13c closes the intake end of the exhaust passage 12c, pipe 10 projecting through the header into that passage. The relations of the high velocity tube, the main exhaust chamber or passage, and the air passage, in the so-far described part of the muffler (the right hand part in Fig. 6), are the same as in Fig. 2, with the main body of exhaust directly surrounding the high velocity tube, and the air passage on the outside surrounding the main exhaust body. That part of the muffler may be as long as is desired or necessary for pre-heating the air to as high a temperature as may be by heat exchange with the main body of exhaust; and also for expanding and cooling the main exhaust body.

The other end of exhaust passage 12d is closed by a header 60 through which the walled transfer passages 62 extend. These transfer passages are open at one end, at 64, to take the exhaust gases from passage 12d, and their other ends deliver the exhaust gases into an annular space 66 that is enclosed between an outer wall 68 and two inner conoidal walls 70 and 72. Those latter ends of the transfer passages 64 deliver into space 66 through openings 74 in outer wall 68. Those openings may be completely open, as shown in Fig. 6a; or may be formed as perforations in wall 68 as shown in Fig. 6 at 74a. Wall 68 is preferably but not necessarily doubleconoidal in form as shown in the drawings. The larger end of conoidal wall 70 joins with the outer (left hand in Fig. 6) end of outer wall 68. The larger, inner, end of cone 72 similarly joins with the inner end of outer wall 68. These several parts are rigidly joined together, as by welding, so that 70 and 72 are rigidly concentrically supported in 68 with their two smaller ends in the annularly spaced concentric relation shown in Figs. 6, 6a and 7. Spacing webs, such as shown at 71 in Fig. 7 may be used to maintain that annularly spaced relation. The larger end of cone 72, and the corresponding end of wall 68, are spaced from header 60, as shown in Figs. 6 and 6a so as to leave a space which forms the passage 92 leading from air passage 20d to the open end of cone 72. The walled transfer passages 62 cross that passage 92 but do not materially obstruct it.

The high-velocity jet tube 30c extends through header 60 and a surrounding tube 80 that is rigidly welded at one end into the header. Preferably but not necessarily the outer (left-hand) end of tube 80 extends concentrically and in annularly spaced relation through the small outer end of cone 72, leaving an annular gap 82 between it and the small discharge end of that cone. If 80 does not extend so far, then the annular nozzle gap 82 immediately surrounds tube 30c. Between the small discharge end of cone 72 and the small end of cone 70, the annular gap 84 provides a nozzle for the flow of gases from space 66, around cone 72 into the interior of cone 70 immediately surrounding the annular stream of air that flows through the nozzle gap 82.

The discharge end of the high-velocity jet tube 30c projects into the interior of cone 70, preferably somewhat beyond the end of 80 and preferably also somewhat beyond the two annular nozzle gaps 82 and 84.

Tube 80 is preferably annularly spaced around tube 30c, so as to provide for a flow of part of the main body of hot exhaust gas from chamber 12d around that part of 30c which would otherwise be directly surrounded by the air in passage 92 and in the interior of cone 72. That assists in keeping the jet gases in 30c at high temperature.

The various parts of the muffler may be supported in their described relations to each other by welding at their points of juncture and/or by suitable supporting brackets. The outer (left-hand) end of wall 68 fits against the tapered end portion 20e of outer tube 20c and may either merely tightly abut it or preferably be welded to it. High velocity tube 30c is supported in its central position by suitable brackets or spiders.

The annular space 66, through which the main body of exhaust gas passes to reach the annular nozzle gap 84, may be open, as shown for example in Fig. 6a, or it may contain one or more perforated cylindric walls 90, such as shown in Figs. 6 and 7, for muffling purposes. These perforated walls also have a turbulence or mixing effect on the gases so that they arrive at the nozzle and the combustion chamber at uniform temperature.

In operation, the high-velocity jet tube 30c takes a small proportion, say one-eighth, of the hot exhaust gases from the input 10 at the pressure there existing, usually considerably above atmospheric. That part of the gases moves at high velocity through the tube, emerging as a hot jet from its discharge end. The fact that tube 30c is directly surrounded by the main body of exhaust gas, in 12d and also preferably in 80, for a major, or the greater, portion of its length, and also surrounded by the pre-heated air through the rest of its length, acts materially to keep the gas in 30c hot.

The main body of exhaust gas is discharged from 10 into the main exhaust passage 12d around 30c. Passing through that passage the main body then passes through the transfer passages 62 into space 66 and thence out through the annular nozzle opening 84 into the interior of cone 70.

Air, under volumetric control at 13d, passes into and through the air passage 20d surrounding the exhaust passage 12d and is there heated by heat exchange through the wall of tube 12c. Although the main current of air flows inwardly through the passage 92, between the transfer passages 62, from passage 20d into the large open end of cone 72, the air also has access to, and to some extent flows through, the annular space 20f which, as an extension of air passage 20d, surrounds the wall 68 and parts of the transfer passages 62. The air may be thus further heated in 20f; so that the air stream entering cone 72 is pre-heated to a temperature as high as may be by heat exchange with the exhaust gases. The air is also further heated in the passage 92 and the passage through the interior of cone 72. Those passages, walled by header 60, cone 72 and tube 80 form an active part of the air heating passage wherein the air is heated from the main body of exhaust in the main gas passage. In the form of Fig. 6 the transfer passages 62, and space 66, and also the annular space within tube 80 form parts of the main gas passage.

The high velocity gases in 30c are kept at high temperature during their passage through the first part of tube 30c by the immediately surrounding hot exhaust gases in passage 12d; and then during the remainder of their passage through 30c by the immediately surrounding gases in 80 and the surrounding pre-heated air in 72 and the hot air and gases flowing around the end of the tube from the annular nozzles 82 and 84. (It will be understood, in all the forms of muffler here described, that all the tubular and other walls lying between the various gas and air passages and spaces are of heat conductive material.) The gases consequently emerge from tube 30c in a jet at high velocity and high temperature. That jet action then acts as an ejector, forcibly drawing the pre-heated air through annular nozzle 82 and the exhaust gases through annular nozzle 84; and causing turbulent admixture of the hot jet gas, the pre-heated air, and the exhaust gases. The admixture of the gases with the air is particularly effective because the air at the jet is in an annular stream lying between the two gas streams. The result is not only to reduce the exhaust back-pressure on the engine, but to thoroughly complete oxidation and burning of any unburned matter in the exhaust in the combustion chamber 100 in cone 70, and/or in the outlet 102 or the tail pipe connected to it.

In all forms of the muffler, the fact that the air passage surrounds the exhaust gases tends to minimize radiation and conduction of heat from the hot gases and consequently tends to keep them, and the high velocity jet and the whole muffler at relatively high temperature so as to promote the final combustion. The maintenance of high temperature and combustion is also promoted by making all of the wall structure of the mufflers of fairly heavy metal (e. g. three-sixteenths inch thick) for the purpose of holding heat. And, to further minimize loss of heat by radiation and conduction, the external walls may be surrounded by a jacket 120 of heat insulating material, covered by a protective metal sheath 122, as shown in Figs. 2 and 6.

To insure ignition and final combustion of unoxidized matter in the exhaust gases, particularly of whole charges that may pass through the engine without ignition and consequently reach the muffler in relatively cold condition, an igniter is provided in a position to be maintained at igniting temperature by the high velocity jet and the combustion that takes place in the combustion chamber. Such an igniter is shown at 110 in Fig. 6. It may be composed of a piece of any suitable refractory heat-holding material, such as a suitable ceramic, or for example a piece of arc carbon. As shown for instance in Fig. 6, it is supported by brackets 112 and 114 on tube 30c and in outlet 102, in a position concentric with the tube and close to its discharge end. A similar ignition element may be used in the muffler of Figs. 1 and 2, as indicated at 110a in Fig. 2. The temperature in the combustion chamber, in either form of the muffler in average operation, has been found to be about that of red heat; due to both the high temperature jet and the heat of combustion that takes place there. The igniter is thus normally maintained at about that temperature and serves to insure ignition and complete combustion. When the engine is operating in normal operating ranges more or less continuous flame combustion takes place in the combustion chamber at the discharge end of the high velocity jet tube. During deceleration when relatively cold unburned or even liquid fuel charges may pass through the muffler, or during idling, flame combustion may be intermittent in the absence of the igniter.

It has been found that combustion or highly effective oxidation of the unburned exhaust residue first takes place at the point where the mixed gas and preheated air first come into contact with the hit high velocity tube; and that is especially so if the mixture is turbulent.

In the form of Figs. 1 to 5 that effective oxidation starts inside the conical portion 12a of exhaust tube 12, where the preheated air enters 12a through the louvered openings 50 and turbulently admixes with the gases. Turbulence in both air and gas streams is also set up by the restricted openings in the diaphragms 14 and 44.

In the form of Fig. 6 and following that initial combustion or oxidation commences at the point where the pre-heated air and gas, flowing through nozzle openings 82 and 84 are admixed around high velocity tube 36c anterior to its end. Here, turbulence is set up by that admixing; turbulence is set up in the gas stream by its tortuous flow through 66, and the perforations therein, if used; and turbulence is set up in the air stream by its tortuous flow through the cross passage 92.

The fact that the gas and pre-heated air are not admixed until reaching a point near the end of the high velocity tube prevents initiation of oxidation in the major part of the muffler where it is desired to cool the gases.

I claim:

1. In muffler devices, the combination of means providing an elongate tubular gas passage having an outer heat conductive wall, an exhaust gas intake discharging into one end of the gas passage, an outer elongate tubular wall spacedly surrounding the heat conductive wall of the gas passage and forming therewith an annular air passage for pre-heating air by heat exchange with the gas in the gas passage, means for admitting air to one end of the air passage, an imperforate high velocity tube extending in annular spacing longitudinally through the gas passage, having a fully open intake end directly in the gas intake and extending beyond the other end of the gas passage and having an open discharge end for discharge of hot gas at relatively high velocity, a wall spacedly surrounding the discharge end of the high velocity tube and forming an annular nozzle therearound, a second wall spacedly surrounding the first nozzle-forming wall and forming therewith a second annular nozzle, and structure forming passage means directing gas from the other end of the gas passage to one of said nozzles and directing pre-heated air from the other end of the air passage to the other one of said nozzles.

2. The muffler device defined in claim 1 and in which the passage forming structure directs the pre-heated air to the first nozzle and the gas to the second nozzle.

3. In muffler devices, the combination of means providing an elongate tubular gas passage having an outer heat conductive wall, an exhaust gas intake discharging into one end of the gas passage, an outer elongate tubular wall spacedly surrounding the heat conductive wall of the gas passage and forming therewith an annular air passage for pre-heating air by heat exchange with the gas in the gas passage, means for admitting air to one end of the air passage, a substantially imperforate high velocity tube extending longitudinally through the gas passage, having a substantially fully open intake end in the gas intake and extending beyond the other end of the gas passage and having an open discharge end for discharge of hot gas at relatively high velocity, a header closing the other end of the gas passage and through which header the high velocity tube extends, a conoidal wall concentrically and spacedly surrounding the extending end portion of the high velocity tube, the larger end of said conoidal wall being longitudinally spaced from said header and the smaller end forming an annular nozzle around the end of the high velocity tube, passage means conducting preheated air from the air passage to the space between said conoidal wall and the high velocity tube, a second conoidal wall coaxial with the first conoidal wall, having its smaller end spacedly surrounding the smaller end of said first wall to form therearound another annular nozzle, the second conoidal wall extending beyond the end of the high velocity tube and forming a combustion chamber, a wall enclosing an annular space immediately surrounding the two conoidal walls, the outer tubular air passage wall extending longitudinally beyond said header and being joined to the wall that encloses said annular space, and passage means conducting gas from the gas passage into said annular space.

4. In muffler devices, the combination of means providing an elongate tubular gas passage having an outer heat conductive wall, an exhaust gas intake discharging into one end of the gas passage, an outer elongate tubular wall spacedly surrounding the heat conductive wall of the gas passage and forming therewith an annular air passage for pre-heating air by heat exchange with the gas in the gas passage, means for admitting air to one end of the air passage, an imperforate high velocity tube extending in annular spacing longitudinally through the gas passage, having a fully open intake end directly in the gas intake and having an open discharge end for discharge of hot gas at relatively high velocity, a wall spacedly surrounding the discharge end of the high velocity tube and forming an annular nozzle there-around, a transverse walled air passage leading inwardly from the first mentioned air passage and delivering pre-heated air to said nozzle, a second wall spacedly surrounding the first nozzle forming wall and forming therewith a second annular nozzle, and passage means including a walled passage extending longitudinally across the transverse air passage from the gas passage to the second nozzle.

5. In devices of the character described, the combination of an elongate walled main gas passage having a gas intake for hot exhaust gases and adapted to pass the major portion of the exhaust gases, an elongate walled air passage having a heat conductive wall exposed directly to the hot exhaust gases in the main gas passage to heat air passing through the air passage, an imperforate high velocity tube having a fully open intake end located within said gas intake, and having an open discharge end for delivery of hot gases, said high velocity tube adapted to receive and freely transmit to its discharge end without material expansion a minor portion of the hot exhaust gases, the walled gas and air passages including means for causing admixture of the heated air and exhaust gases and for delivering the admixture to a zone immediately surrounding the high velocity tube at a point removed from its intake end and anterior of its discharge end, and including also walled passage means for conducting the admixture along the high velocity tube to and past its discharge end.

6. The combination defined in claim 5 and in which the walled gas and air passages also include means causing turbulence in said admixture.

7. The combination defined in claim 5, and also including a heat retaining ignition element located directly in the discharge of the high velocity tube.

8. The combination defined in claim 5, and in which the main gas passage is formed within a wall spacedly surrounding the high velocity tube, said wall extending substantially to the discharge end of said tube, in which the air passage is formed within a wall spacedly surrounding the gas passage wall, said air passage wall extending beyond the ends of the high velocity tube and the gas passage wall, said gas passage wall being perforated in a zone near the discharge end of the high velocity tube to admit air to the gas passage from the air passage at a point anterior of the discharge end of the high velocity tube.

9. The combination defined in claim 8, and also including a heat retaining ignition element located directly in the discharge of the high velocity tube.

10. The combination defined in claim 8, and also including perforated plates extending across the gas and air passages.

11. The combination defined in claim 5, and in which the main gas passage is formed within a wall spacedly surrounding the high velocity tube, in which the air passage is formed within a wall spacedly surrounding the gas passage wall, including also a frusto-conical nozzle-forming wall surrounding the high velocity tube with its smaller end annularly spaced from said tube at a point anterior of the tube discharge end, transverse air passage means leading from the first mentioned air passage to the interior of the larger end of the frusto-conical wall, a second wall having and end spacedly surrounding the smaller end of the frusto-conical wall to form a nozzle outlet within said second wall and the smaller end of the frusto-conical wall, and walls forming with said second wall an extension passage leading from the main gas passage to said nozzle outlet.

12. The combination defined in claim 11, and including also at least one perforated plate extending across the extension passage.

13. The combination defined in claim 11, and also including a heat retaining ignition element located directly in the discharge of the high velocity tube.

References Cited in the file of this patent

UNITED STATES PATENTS

| | | |
|---|---|---|
| 1,773,256 | Breitwieser | Aug. 19, 1930 |
| 1,858,637 | McDonald | May 17, 1932 |
| 2,155,052 | Byland | Apr. 18, 1939 |
| 2,203,554 | Uhri | June 4, 1940 |
| 2,263,407 | Kittell | Nov. 18, 1941 |
| 2,548,563 | Smith | Apr. 10, 1951 |
| 2,725,948 | Keene | Dec. 6, 1955 |

FOREIGN PATENTS

| | | |
|---|---|---|
| 251,728 | Italy | Jan. 29, 1927 |

U. S. DEPARTMENT OF COMMERCE
PATENT OFFICE

CERTIFICATE OF CORRECTION

Patent No. 2,829,730     Harry D. Barkelew     April 8, 1958

It is hereby certified that error appears in the printed specification of the above numbered patent requiring correction and that the said Letters Patent should read as corrected below.

Column 9, line 24, for "and end" read -- an end --; column 10, line 1, after "outlet" insert -- between --.

Signed and sealed this 10th day of June 1958.

(SEAL)
Attest:

KARL H. AXLINE
Attesting Officer

ROBERT C. WATSON
Commissioner of Patents